(12) United States Patent
Bonomi

(10) Patent No.: US 10,883,641 B2
(45) Date of Patent: Jan. 5, 2021

(54) QUICK DISCONNECT COUPLING

(71) Applicant: Vittorio Bonomi, Fort Lauderdale, FL (US)

(72) Inventor: Vittorio Bonomi, Fort Lauderdale, FL (US)

( * ) Notice: Subject to any disclaimer, the term of this patent is extended or adjusted under 35 U.S.C. 154(b) by 376 days.

(21) Appl. No.: 15/941,044

(22) Filed: Mar. 30, 2018

(65) Prior Publication Data

US 2019/0301650 A1    Oct. 3, 2019

(51) Int. Cl.
*F16L 37/23* (2006.01)
*F16L 37/42* (2006.01)

(52) U.S. Cl.
CPC .............. *F16L 37/23* (2013.01); *F16L 37/42* (2013.01)

(58) Field of Classification Search
CPC .................................. F16L 37/23; F16L 37/42
See application file for complete search history.

(56) References Cited

U.S. PATENT DOCUMENTS

| | | | |
|---|---|---|---|
| 3,279,497 A | 10/1966 | Norton et al. | |
| 3,729,023 A * | 4/1973 | Hammond | F16L 37/23 137/614.03 |
| 3,758,137 A | 9/1973 | Kershaw | |
| 3,809,122 A | 5/1974 | Berg | |
| 4,485,845 A * | 12/1984 | Brady | F16L 37/23 137/614.04 |
| 4,506,862 A * | 3/1985 | Spinosa | F16L 37/42 251/149 |
| 4,638,975 A * | 1/1987 | Iuchi | F16L 37/23 137/614.05 |
| 4,702,537 A | 10/1987 | Mattingly et al. | |
| 4,738,431 A | 4/1988 | Perkins | |
| 5,039,304 A | 8/1991 | Heil | |
| 5,092,364 A | 3/1992 | Mullins | |
| 5,211,197 A | 5/1993 | Marrison et al. | |
| 5,255,714 A | 10/1993 | Mullins | |
| 5,361,801 A | 11/1994 | Kerpan et al. | |
| 5,709,243 A * | 1/1998 | Wells | F16L 37/23 137/614.01 |
| 5,730,185 A | 3/1998 | Wilkins et al. | |
| 5,810,048 A * | 9/1998 | Zeiner-Gundersen | F16L 29/04 137/614.04 |

(Continued)

FOREIGN PATENT DOCUMENTS

EP    0519759    12/1992

*Primary Examiner* — James M Hewitt, II
(74) *Attorney, Agent, or Firm* — Allen, Dyer, Doppelt + Gilchrist, P.A.

(57) ABSTRACT

A coupling includes a socket housing that receives a plug. A plunger operates as a fluid valve and side orifices in the plunger allow fluid flow therethrough and is longitudinally movable from a forward sealed position where a sealing ring is in sealed engagement with a fluid channel to prevent fluid flow, and a retracted, unsealed position engaging a connected plug allowing fluid flow into the tubular plunger via the side orifices into the fluid channel. A plunger spring as a preferred wave spring engages the first end of the plunger and biases the plunger into the forward sealed position. First and second conical gaskets at the plunger spring allow the plunger spring as a preferred wave spring, plunger, and any connected plug to rotate within the socket housing and minimize torsion forces and stress on the plunger spring and within the socket housing.

14 Claims, 6 Drawing Sheets

(56) References Cited

U.S. PATENT DOCUMENTS

| | | | |
|---|---|---|---|
| 6,056,010 A * | 5/2000 | Wells | F16L 37/34 137/614 |
| 6,378,841 B1 | 4/2002 | Russell | |
| 6,669,171 B1 | 12/2003 | Stunkard | |
| 7,028,711 B1 * | 4/2006 | Scott | F16L 37/23 137/614.06 |
| 7,117,892 B2 | 10/2006 | Krywitsky | |
| 7,237,990 B2 | 7/2007 | Deng | |
| 7,350,765 B2 | 4/2008 | Leblanc et al. | |
| 7,686,037 B2 | 3/2010 | Krywitsky | |
| 8,113,484 B2 | 2/2012 | Hostetter et al. | |
| 8,398,053 B2 | 3/2013 | Ezekiel | |
| 8,424,841 B2 | 4/2013 | Frenzel | |
| 8,496,226 B2 | 7/2013 | Dalluge et al. | |
| 8,720,854 B2 | 5/2014 | Dalluge et al. | |
| 9,217,529 B2 | 12/2015 | Crompton et al. | |
| 9,285,039 B2 | 3/2016 | Collison et al. | |
| 9,303,774 B2 | 4/2016 | Lomax | |
| 2004/0124390 A1 | 7/2004 | Schneller et al. | |
| 2007/0246108 A1 | 10/2007 | Conway | |
| 2013/0307263 A1 | 11/2013 | Parks et al. | |
| 2013/0341904 A1 | 12/2013 | Lehmann et al. | |

\* cited by examiner

QUICK DISCONNECT COUPLING

FIELD OF THE INVENTION

The present invention relates to the field of couplings, and more particularly, this invention relates to quick disconnect couplings having improved turning or rotative/swivel capability.

BACKGROUND OF THE INVENTION

Fluid flow quick disconnect couplings are well-known in the art, and also referred to by some skilled in the art as quick connect or disconnect fittings, quick connect couplings, and even quick release fluid couplings. They provide a fast, make-or-break connection of fluid lines such as for air, water or other fluid transfer lines. Operated by hand, these quick-disconnect fittings or couplings replace threaded or flanged connections, which often require manual manipulation by wrenches in order to connect/disconnect the mating pieces to hoses or tools. When equipped with self-sealing valves, these quick disconnect fittings will, upon disconnection, automatically contain any fluid in the supply line that contains the quick disconnect fitting having the sealing valve.

Throughout the world, these quick-disconnect couplings, or fittings, and similar emergency breakaway fittings, are manufactured and used in a variety of applications and coupling techniques. The quick connect or disconnect fitting configuration allows for rapid connection or disconnection manually, without requiring the use of a hammer or spanner. There are quick connect or disconnect fittings that are configured without a valve, with one valve, with two valves, and with one or two locking devices for coupling hoses, pipes and hydraulic lines used with agricultural farm equipment, hydraulic lines, injection molding equipment, scuba diving equipment, self-contained breathing apparatus (SCBA), also referred to as a compressed air breathing apparatus (CABA), or simply a breathing apparatus (BA), and numerous other industrial devices. The quick disconnect fittings may work with different fluid media, including air, volatile or other dangerous gases, fuel, and water. There are multiple solutions and technologies related to the quick disconnect fittings available in the marketplace and every technology has its own positive benefits and constraints. A user's choice for a particular quick disconnect fitting or coupling is often defined based on various criteria, including price, application, governmental regulation standards, media, and dimensions. These fittings can even be used in food and similar fluid transfer lines where reliability and health are paramount.

One common quick disconnect fitting or coupling design uses hardened balls or pins that engage a groove in a coupler plug and hold it securely against a seal while permitting the assembly to swivel or turn, thereby preventing the kinking or twisting of hoses. With this type of design, the fitting includes a sliding sleeve on a socket and one or more valves. The locking balls are released when the sliding sleeve is retracted, which permits a plug to be inserted or removed relative to the socket. The sliding sleeve automatically returns to the locked position when released. The valve may be designed as an automatic shut-off valve, such as a plunger movable in the socket of the quick disconnect coupler, to seal instantly upon uncoupling, eliminating the need for a separate shut-off. These quick disconnect couplers come in different sizes and shapes with common sizes including ¼, ⅜, and ½ inch couplings. Sometimes the size refers to air flow capacity by some manufacturers. It may also refer to the approximate plug tip diameter. For example, a 1-inch coupler will drop the pressure by 1 (one) PSI (pounds per square inch) at a flow rate of 10 CFM (cubic feet per minute) and 5 PSI at 20 CFM. These quick disconnect couplers are commonly used with air supply hoses and tool connectors on hand-operated air tools. The couplings may be pressure rated well above 90 PSI. They also come in different configurations. The plug may be made of a plated hardened steel and a socket may come in both brass and plated hardened steel.

Some technical problems occur because large springs often force the quick disconnect couplings or fittings to have specific dimensional constraints. Because the quick disconnect coupling or fitting is a junction among two pieces, e.g., the socket and plug, and standard usage requires the coupling to be quickly connected or disconnected, the connection may not be that secure and stable, especially with a rotative or swivel movement. Additionally, the rotative or swivel movement among the two connector pieces or fittings as the plug and socket can stress any internal springs due to the torsional force applied from the other end of the connector or fitting. Pressure drops and flow constraints also result from forces on internal components. It would be advantageous to have a compact quick disconnect coupling that allows swiveling or rotation without damaging any internal springs, while also providing for an efficient connection or disconnection and an efficient valve mechanism that is compact and reliable.

SUMMARY OF THE INVENTION

This summary is provided to introduce a selection of concepts that are further described below in the Detailed Description. This summary is not intended to identify key or essential features of the claimed subject matter, nor is it intended to be used as an aid in limiting the scope of the claimed subject matter.

A quick disconnect coupling comprises a generally annular socket housing having a bore extending along a longitudinal axis therethrough and defining an axial fluid channel and a plug receiving end configured to receive therein a plug. The socket housing further comprises an outer surface and shoulder stop formed thereon and apertures adjacent the plug receiving end. An annular lock sleeve is carried by the socket housing and has an annular recess defining a spring passage with the outer surface of the socket housing. The lock sleeve is movable on the socket housing between a retracted position and an extended locking position toward the plug receiving end, and includes an annular ball recess formed at the end of the lock sleeve adjacent the plug receiving end.

A spring is retained in the spring passage and engages the shoulder stop and biases the lock sleeve into the extended locking position. Latch balls are within the apertures and retained therein by the lock sleeve. When the lock sleeve is in the extended locking position, the latch balls are locked radially inward and engage an annular groove on a plug to lock the plug to the socket housing. When the lock sleeve is retracted, the latch balls are released to move radially outward while retained within the apertures by the ball recess during coupling and decoupling of a plug with the socket housing. The bore includes a first internal channel portion at the plug receiving end and a second internal channel portion adjacent the first internal channel portion.

A plunger operative as a fluid valve is received within the axial fluid channel of the socket housing and has a first end as a closed plunger face and a sealing ring thereon. A second end is substantially open and faces the plug receiving end. Side orifices within the plunger allow fluid flow therethrough. The plunger as a fluid valve is longitudinally movable from a forward sealed position where the sealing ring is in sealed engagement with the second internal channel portion to prevent fluid flow, and a retracted, unsealed position engaging a connected plug allowing fluid flow into the tubular plunger via the side orifices into the second internal channel portion. A spring, in an example, a wave spring, is disposed within the second internal channel portion and engages the first end of the plunger and biases the plunger into the forward sealed position.

In an example, the ball apertures are tapered inward and have a diameter to prevent a latch ball from passing into the axial fluid passageway. A first retaining ring is in the axial fluid channel, and a first conical gasket is on the wave spring. A second conical gasket engages the first retaining ring and slidable with the first conical gasket, wherein the first conical gasket, wave spring, plunger, and any connected plug are free to rotate within the socket housing and minimize torsion forces and stress on the spring and within the socket housing.

A second retaining ring is on the socket housing adjacent the plug receiving end and configured to engage the lock sleeve in its extended locking position and prevent further sliding movement. The spring within the annular recess may comprise a compression spring. An O-ring in the first internal channel portion is configured to engage a connected plug in sealed engagement to prevent fluid flow around the plug. The plunger may comprise an annular groove at the first end and the sealing ring may comprises an O-ring received within the annular groove.

The first end of the tubular plunger may comprise an annular shoulder that engages the wave spring. The orifices may comprise a plurality of orifices formed within the plunger at the open end and extend circumferentially around the plunger. The wave spring may comprise a flat end coil having shim ends.

In yet another example, the quick disconnect coupling may comprise a generally annular socket housing having a bore extending along a longitudinal axis therethrough and defining an axial fluid channel and a plug receiving end configured to receive therein a plug. The socket housing may further comprise an outer surface and shoulder stop formed thereon, and apertures adjacent the plug receiving end. An annular lock sleeve is carried by the socket housing and has an annular recess defining a spring passage with the outer surface of the socket housing. The lock sleeve is movable on the socket housing between a retracted position and an extended locking position toward the plug receiving end and includes an annular ball recess formed at the end of the lock sleeve adjacent the plug receiving end. A spring is in the spring passage and engages the shoulder stop and biases the lock sleeve into the extended locking position.

Latch balls are within the apertures and retained therein by the lock sleeve. When the lock sleeve is in the extended locking position, the latch balls are locked radially inward and engage an annular groove on a plug to lock the plug to the socket housing. When the lock sleeve is retracted the latch balls are released and move radially outward while retained within the apertures by the ball recess during coupling and decoupling of a plug with the socket housing. The bore includes a first internal channel portion at the plug receiving end and a second internal channel portion adjacent the first internal channel portion. The second internal channel portion includes an annular tapered shoulder intersecting the first internal channel portion.

A tubular configured plunger is received within the axial fluid channel of the socket housing and has a first end as a closed plunger face and O-ring thereon. A second end is substantially open and faces the plug receiving end. A plurality of orifices extend circumferentially around the plunger to allow fluid flow therethrough. The plunger is longitudinally movable from a forward sealed position where the O-ring is in sealed engagement with the tapered shoulder of the second internal channel portion to prevent fluid flow, and a retracted, unsealed position engaging a connected plug allowing fluid flow into the tubular plunger via the side orifices and into the second internal channel portion.

A plunger spring that preferably is a wave spring is disposed within the second internal channel portion and has a first end engaging the first end of the plunger and biasing the plunger into the forward sealed position. The plunger spring has a second end and a first conical gasket engaging the second end of the plunger spring. A first retaining ring is mounted in the second internal channel portion and a second conical gasket engages the first retaining ring. The first conical gasket and second conical gasket are in sliding engagement with each other. The plunger spring, plunger, and any connected plug are free to rotate relative to the second conical gasket and within the socket housing and minimize torsion forces and stress on the plunger spring and within the socket housing.

DESCRIPTION OF THE DRAWINGS

Other objects, features and advantages of the present invention will become apparent from the Detailed Description of the invention which follows, when considered in light of the accompanying drawings in which.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

The use of the wave spring as a plunger spring offers the benefit of reduced dimensions both in height and in component parts of the coupling. Also, the quick disconnect coupling is configured to allow the plug to rotate without applying any torque force on the internal spring, which in a preferred example, is a wave spring. Because of the use of joint or dual conical gaskets, many types of springs may be used besides a wave spring. This occurs because of the two conical gaskets that hold the spring in place spin because of their conical shape and permit the spring, plunger, and connected plug to spin. In a preferred example, the conical gaskets are formed from PTFE (Polytetrafluoroethylene), although other similar materials could be used. Other O-rings and sealing gaskets can also be made from PTFE. This overcomes the problem resulting when there is a spinning of the plug and plunger and the torque force creates problems on the attitude of the spring, forcing it to change shape and go out of its seats. At that point, the quick disconnect fitting or coupling would be malfunctioning and would have to be replaced.

An advantage in using the wave spring in such examples is it would not change shape as much as a coil spring would change shape when a torque force is applied. Thus, the use of the conical gaskets is advantageous where one gasket is connected to the wave spring or other spring and allows the wave spring and the plunger with its O-ring or other sealing ring and the plug to rotate, with the first conical gasket, and relative to the second conical gasket that is held in place by the retaining ring. This avoids the torsion forces and stresses that are applied on the spring, and on the quick disconnect coupling or fitting and even the pipe, hose tube and other components connected to the quick disconnect coupling. This double conical gasket provides a dynamic balancing system to work with any other conical coil springs, and thus, is not limited to a wave spring. The use of the double conical gaskets may allow use with almost any type of spring and reduce the torsion forces and stresses.

Figure 1:
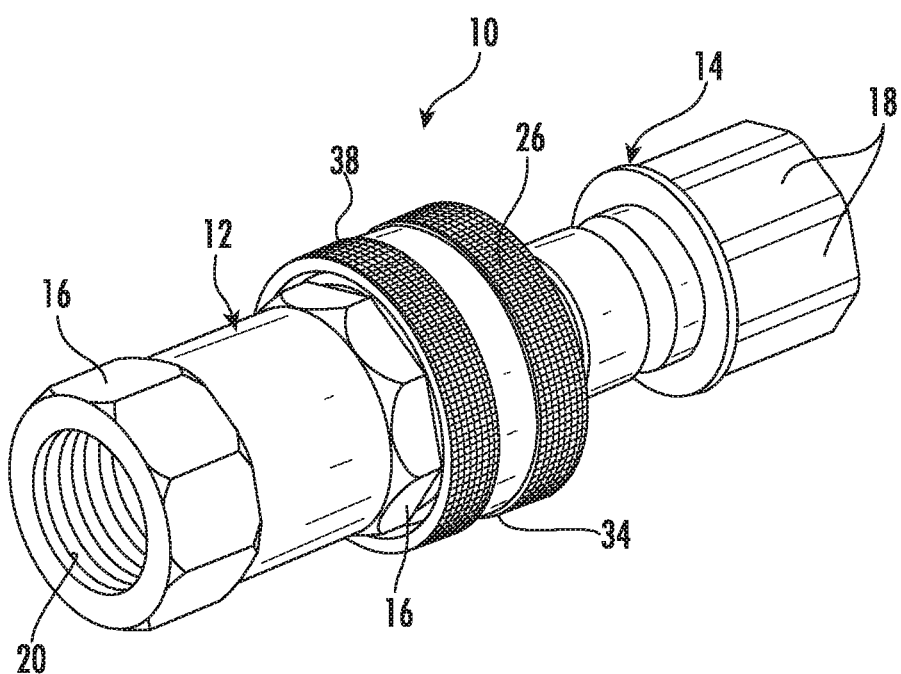
FIG. 1 in an isometric view of the quick disconnect coupling showing the plug and socket housing.
Figure 4A:
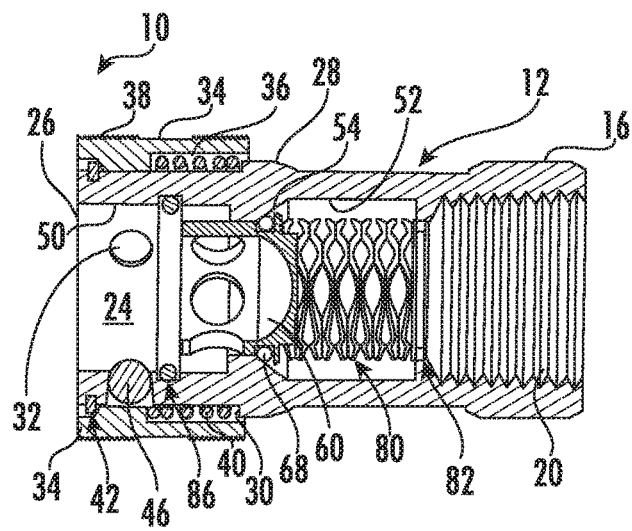
FIG. 4A is a sectional view of the socket housing taken along line 4A-4A of FIG. 2A.
Figure 4B:
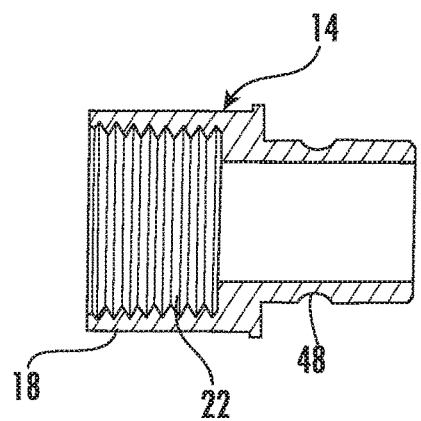
FIG. 4B is a sectional view of the plug taken along line 4B-4B of FIG. 2B.
Figure 6:
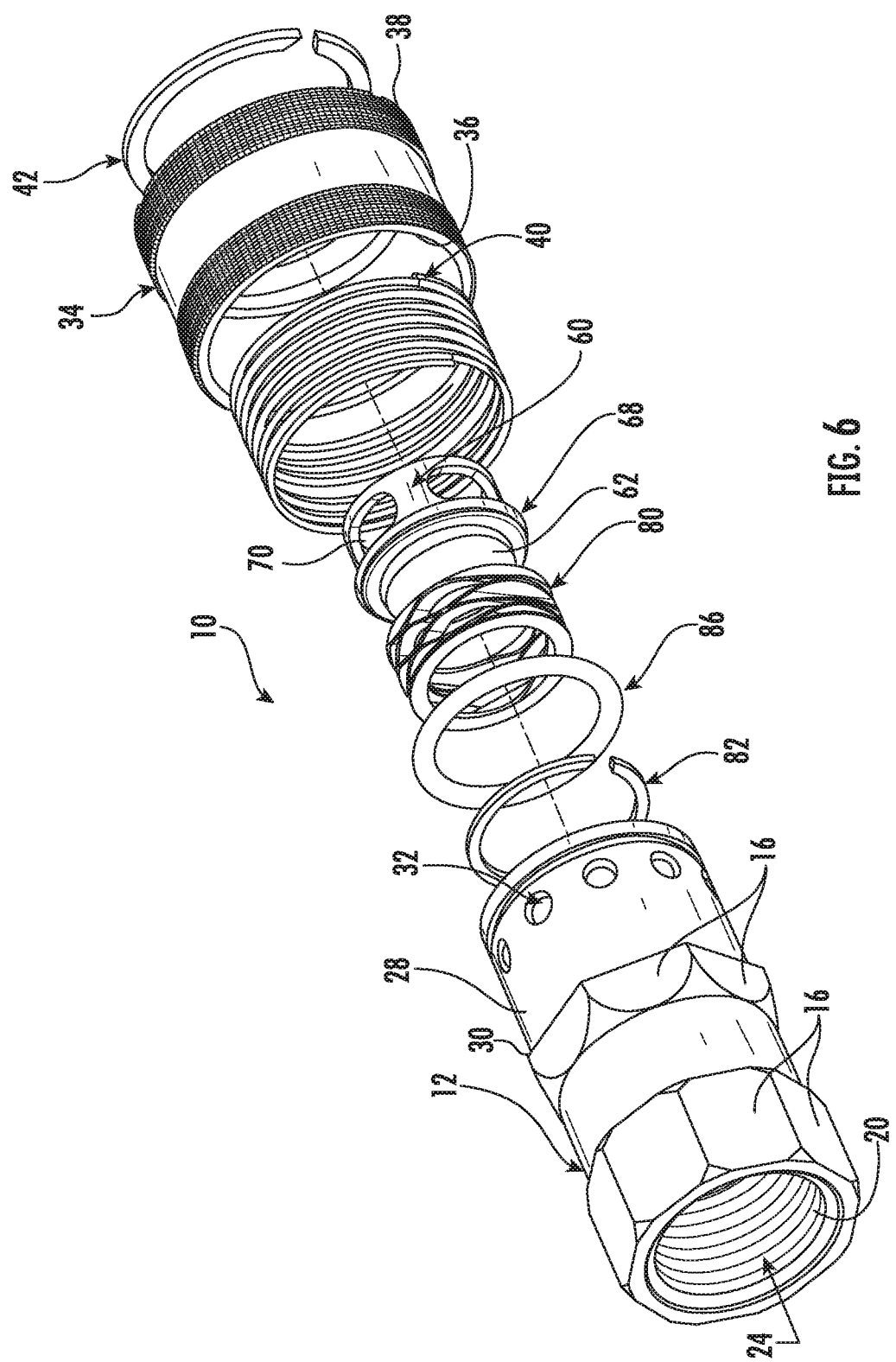
FIG. 6 is an exploded isometric view of the socket housing.

Referring now to FIG. 1, there is illustrated generally at 10 a quick disconnect coupling and showing the socket housing 12 and the plug 14, which connects to the socket housing in a quick connect/disconnect manner. Both the socket housing 12 and plug 14 are generally annular configured and each include flats 16,18 formed on the generally annular socket housing and plug to permit the jaws of a wrench or spanner to be retained for loosening or tightening the plug or socket housing to fluid connectors that operate with an air hose or a pneumatic tool or other pneumatic or hydraulic connectors as a non-limiting example. Each of the socket housing 12 and plug 14 include a female threaded portion 20,22 to connect to male threads on a hose or other connector such as a tool connector as described above. The plug 14 includes an annular but smaller diameter plug extension 20 at one end that fits into a bore extending along a longitudinal axis through the socket housing. The bore defines an axial fluid channel 24. A plug receiving end 26 as shown in FIGS. 4A and 4B. When the socket housing 12 and plug 14 are connected together, a continuous flow passage is defined through the plug and socket housing. As shown in FIG. 4A, the socket housing 12 includes an outer surface 28 and a shoulder stop 30 formed thereon. Apertures 32 are formed in the socket housing 12 adjacent the plug receiving end 26, which is formed as an annular member having a cylindrical outer surface as part of its outer surface, such as best shown in the exploded isometric view of FIG. 6. The outer surface 28 includes the shoulder stop 30 formed adjacent to the flats 16 along their edge and configured to receive a wrench.

Figure 2A:
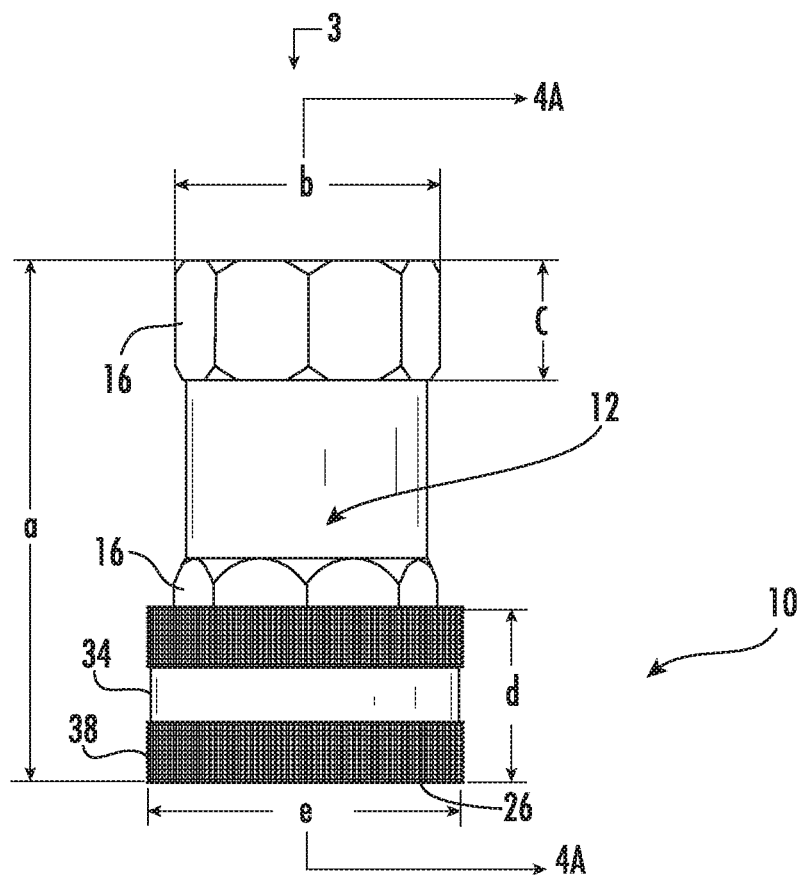
FIG. 2A is a top plan view of the socket housing.
Figure 2B:
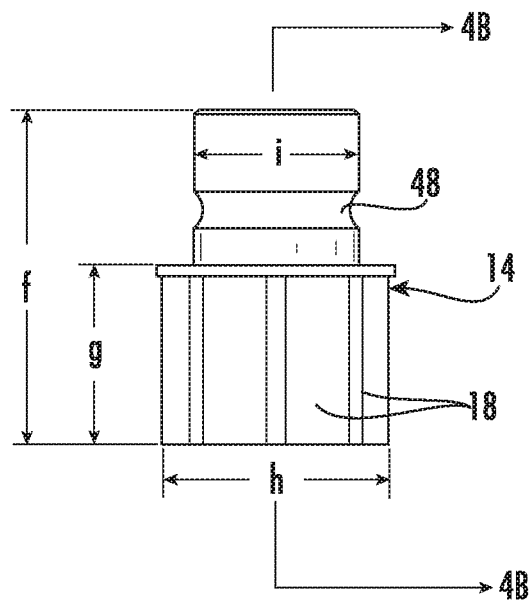
FIG. 2B is a top plan view of the plug.
Figure 5:
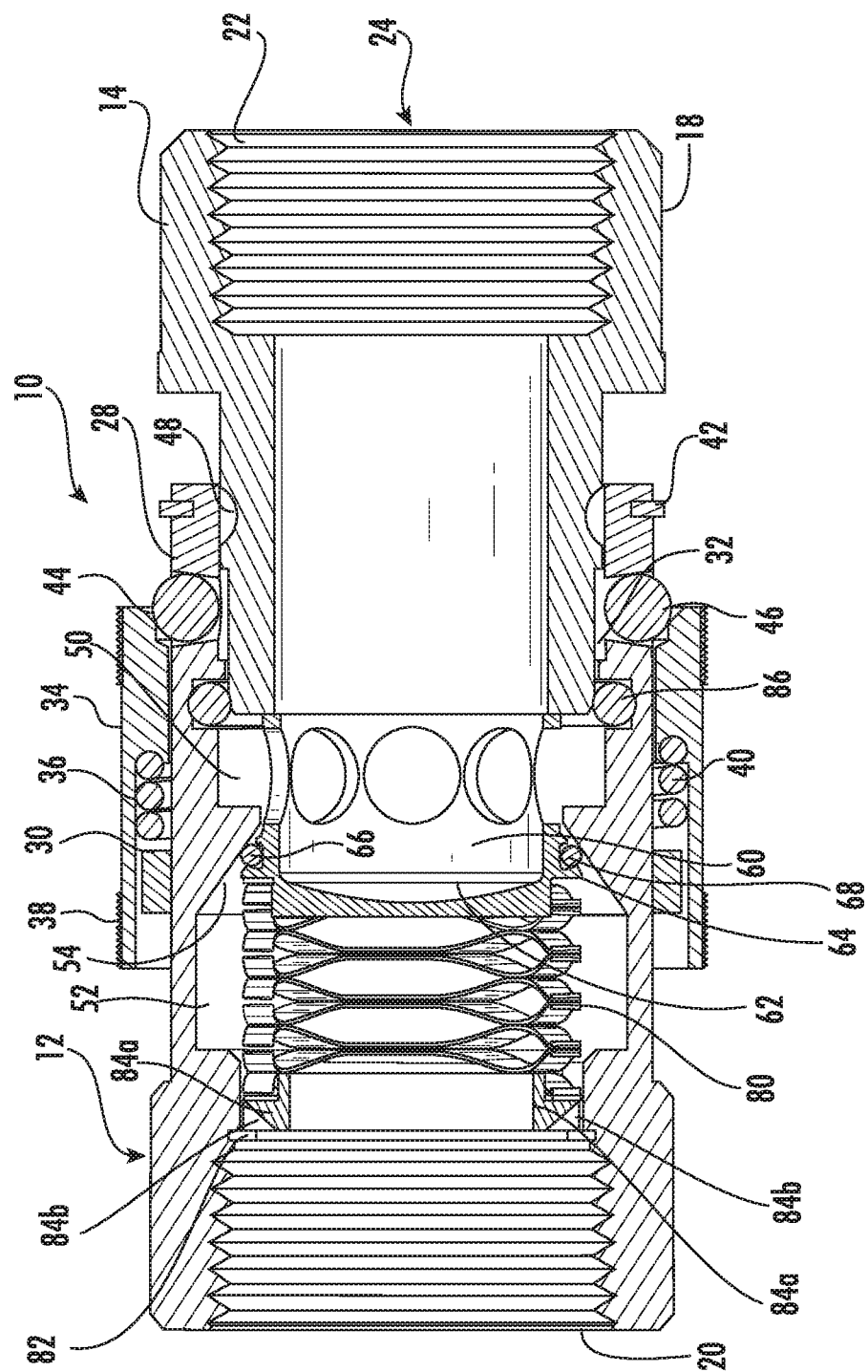
FIG. 5 is an enlarged partial sectional view of the quick disconnect coupling showing the socket housing and plug partially received therein.

An annular lock sleeve 34 is carried by the socket housing 12 and includes an internal annular recess 36 (FIGS. 4A and 5) that defines a spring passage with the outer surface 28 of the socket housing. The lock sleeve 34 is annular or ring-shaped and includes a knurled outer surface 38 so that a user may grasp it securely between their thumb and index finger, for example, and pull back against a biasing force exerted by a spring 40 contained in the spring passage and engaging the shoulder stop 30 and biasing the lock sleeve 34 into an extended locking position. The lock sleeve 34 is movable on the outer surface 28 socket housing between a retracted position where the internal edge or shoulder defining the recess 36 engages the shoulder stop 30 and an extended locking position toward the plug receiving end where the other end engages a retaining ring 42 on the outer surface (FIG. 5). At that outer edge, an annular ball recess 44 is formed at the end of the lock sleeve adjacent the plug receiving end 26 (FIGS. 4A and 5) and configured as a 45° taper at the front edge and then followed by an indented shoulder portion, which engages also the retaining ring 42 when locked. Latch balls 46 are within the apertures 32 and retained therein by the lock sleeve 34. In this example, three apertures 32 are formed for a total of three latch balls 46. When the lock sleeve 34 is in the extended locking position, the latch balls 46 are locked radially inward and engage an annular groove 48 on the plug (FIGS. 2B, 4B and 5) to lock the plug 14 to the socket housing 12. When the lock sleeve 34 is retracted, the latch balls 46 are released to move radially outward, but retained within the apertures 32 by the ball recess 44 during coupling and decoupling of a plug 14 with the socket housing 12.

As best shown in FIGS. 4A and 5, the bore 24 includes a first internal channel portion 50 at the plug receiving end 26 and a second internal portion 52 adjacent the first internal portion. In this example, the second internal channel portion 52 has a slightly greater diameter than the first internal channel portion 50 and the second internal channel portion 52 includes an annular downward tapered shoulder 54 intersecting the first internal channel portion so that the second internal channel portion decreases in diameter in the direction toward the first internal channel portion as shown in FIG. 5.

A tubular configured plunger 60 operates as a fluid valve and is received within the axial fluid channel 24 of the socket housing 12 and has a first end forming a closed plunger face 62 with a convex outwardly curving surface and an annular plunger shoulder 64 that includes a groove 66 that supports a sealing ring 68 as a preferred O-ring to allow rotation. The second end of the plunger is substantially open and faces the plug receiving end 26. A plurality of plunger orifices 70 are formed in the cylindrical side of the tubular configured plunger 60 and extend circumferentially around the plunger to allow fluid to flow therethrough. The plunger 60 is longitudinally movable from a forward sealed position where the sealing ring 68 as an O-ring or similar gasket is in sealed engagement with the tapered annular plunger shoulder 64 of the second internal channel portion 52 to prevent fluid flow around the plunger 60 and a retracted, unsealed position engaging a connected plug 14 allowing fluid flow into the tubular plunger via the side plunger orifices 70 and into the second internal channel portion 52. It is possible that the tapered annular plunger shoulder will include ridges or knurls or other surface that effects a better seal with the O-ring or gasket and prevent fluid flow.

A spring 80 is disposed within the second internal channel portion 52 and has a first end that engages the first end of the plunger 60 and biases the plunger into the forward sealed position so that its O-ring 68 is sealingly engaged with the annular tapered plunger shoulder 64 of the second internal channel portion 52. In an example, the spring 80 is a wave spring.

Figure 5A:
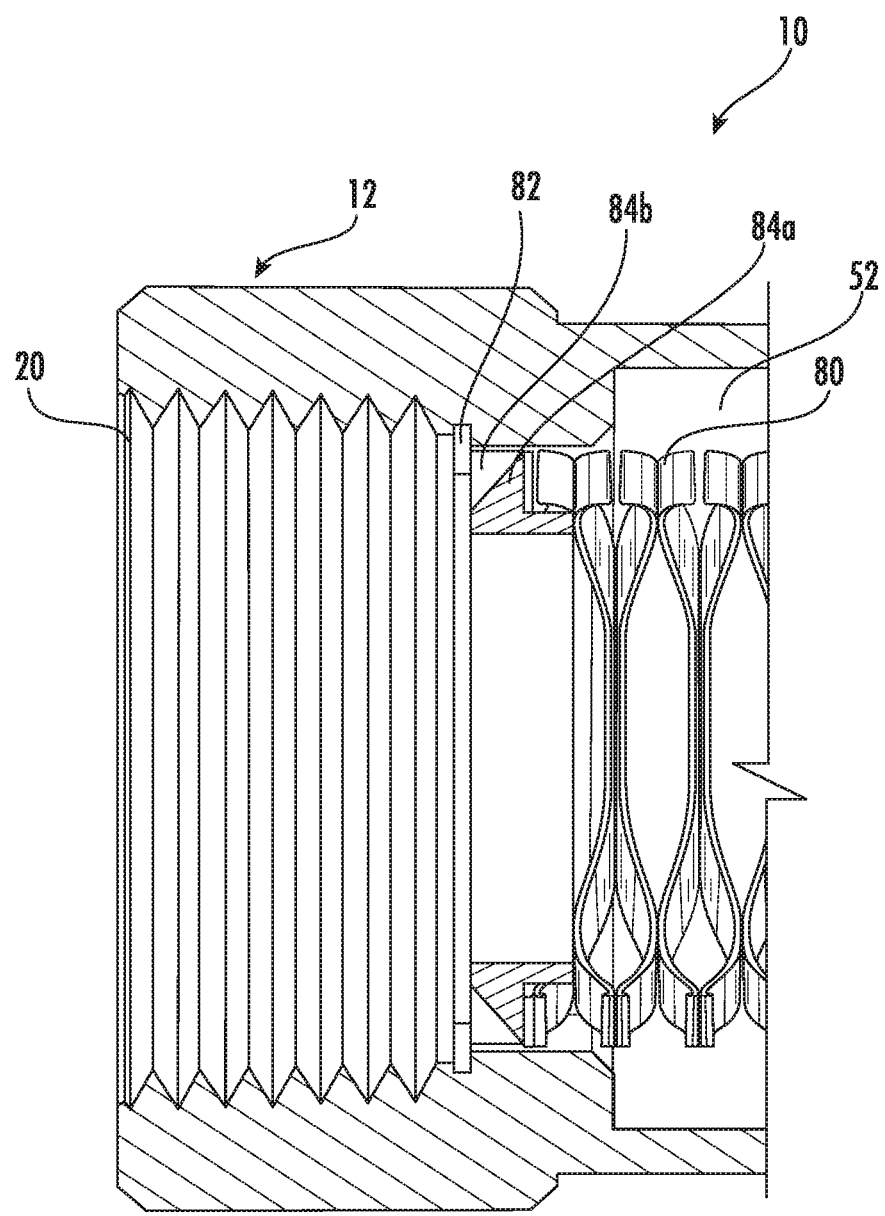
FIG. 5A is an enlarged sectional view of the end of the socket housing of FIG. 5.

In this example, a spring retaining ring 82, also referred to as a first retaining ring, is fixed in the axial fluid channel 24 adjacent the female threaded portion 20 and within the second internal channel portion 52. The spring 80 has a second end and a first conical gasket 84a is disposed on the second end of the spring as in an annular groove formed by the first conical gasket that receives in the annular groove the spring as best shown in FIG. 5A.

A second conical gasket 84b is fixed in place by the first retaining ring 82. The configuration of the first and second conical gaskets 84a, 84b permit rotation such that the first conical gasket, spring 80, plunger 60, and any connected plug 14 are free to rotate within the socket housing 12 and minimize torsion forces and stress imparted on the spring and within the socket housing as explained above. The wave spring 80, plunger 60, and plug 14 may rotate together when the plug is fully connected and sealed. As best shown in FIG. 5A, the first and second conical gaskets 84a, 84b may be configured to interface each other by flat surfaces that are angled about 45° to the vertical plane to allow rotative movement relative to each other. The conical gaskets 84a, 84b permit the internal components and the other end connection of the fitting or coupling to rotate together and guarantees a stable and secure swivel or rotative function without the risk of torsion forces imparted on the spring, which can damage the function of the quick disconnect coupling. This avoids the effects of any torsion forces and consecutive stresses on the spring as well as on the quick disconnect fitting or coupling and also on the pipe and hose tubes connected to the quick disconnect coupling. Thus, this double conical gasket configuration as first and second conical gaskets 84a, 84b provide a dynamic balancing system that works with any other conical coil spring as well as the preferred wave spring. As noted before, the preferred material to form the double conical gasket is PTFE as polytetrafluoroethylene, also referred to as Teflon. Other similar materials may be used.

These dual gaskets 84a, 84b may slide relative to each other and in conjunction with the first retaining ring 82 and hold the wave spring in place and allow the quick disconnect coupling 10 to overcome the disadvantages when there is spinning or rotative torque applied onto the plug 14 and the plunger 60 and the torque force imparts the attitude of the spring, forcing it to change shape and move out of its seats relative to the plunger and the internal surface of the socket housing. Thus, the quick disconnect coupling would malfunction and would need to be replaced. If a coil spring is used instead of a wave spring, the shape of that spring could change even more when the torque force is applied. Thus, the use of the wave spring imparts greater stability.

In an example, the wave spring 80 may be formed as a flat end coil having shim ends. One of the shim ends engages the annular plunger shoulder 64 on the tubular plunger 60 and the other engages a shoulder formed on the first conical gasket 84a. The latch ball apertures 32 are tapered inward and have a diameter to prevent a latch ball 46 from passing into the axial fluid passageway 24. The retaining ring 42, i.e., the second retaining ring on the socket housing 12 adjacent the plug receiving end 26 engages the lock sleeve 34 in its extended locking position and prevents further sliding movement. The spring 40 within the annular internal recess 36 is preferably formed as a compression spring. A sealing ring 86 is formed as an O-ring or similar gasket and positioned in the first internal channel portion 52 within a groove and configured to engage the plug 14 in sealed engagement when the plug is inserted within the bore 24 at the plug receiving end 26 to prevent fluid flow around the plug. All the sealing rings as O-rings may be formed from PTFE and similar materials.

The socket housing 12 and plug 14 may be formed from different materials as known to those skilled in the art, including stainless steel, copper, and brass. The quick disconnect coupling 10 as illustrated may be used for indoor and outdoor use. Dimensions may vary, but the illustrated example as described is for a ½ inch or ¾ inch quick disconnect coupling.

Use of the wave spring 80 permits a reduced spring height of about 50%, while the socket housing 12 body height may be reduced significantly. With the reduction in height of the wave spring 80, the same forces and deflection may be applied as with an ordinary coil or compression spring. The wave spring 80 may operate as a loadbearing device and take up play and compensate for dimensional variations in the quick disconnect coupling 10. In the configuration as illustrated and explained above with the first and second conical gaskets 84a, 84b, the spring 80 as a preferred wave spring is seated in a dynamic balance system as illustrated best in FIGS. 5 and 5A. This permits rotation of the wave spring 80, the plunger 60, and plug 14 when the plug is fully connected and sealed with the latch balls 46 sealed in the annular grooves 48. The conical gaskets 84a, 84b allow any internal components and other end connections of the fitting or coupling 10 to rotate together and guarantee a stable and secure swivel or rotation, i.e., turning, allowing a function without the risk of imparting undue torsion forces on the wave spring 80, which could damage the function of the quick disconnect fitting or coupling 10. With the reduction in 50% of the height of the wave spring 80 compared to many compression springs, it is possible to reduce by 50% the height of the socket housing 12 and save material and reduce dimensions without compromising the quality of the wave spring 80 and closing function of the quick disconnect coupling. The dynamic balancing system allows a rotating or turning, also termed swiveling capability to the quick disconnect coupling without adding additional parts or components to the end connection, i.e., plug receiving end 26, of the fitting or coupling that opens to the quick disconnect plunger 60. This provides excellent stability and safety, particularly where a swivel or turning movement is required.

A wave spring 80 in a preferred example is used instead of a standard coil spring or conical spring to exert force against the valve or plunger 60. The reduction in height created by using the wave spring 80 maintains the same force and deflection as an ordinary coil and/or compression spring. The wave spring 80 operates as loadbearing device and takes up play and compensates for dimensional variations in the quick disconnect coupling 10. The wave spring 80 allows a more dynamic balancing system, permitting rotation of the wave spring, the valve or plunger 60, and a plug 14 in conjunction with the conical gaskets 84a, 84b, thus permitting the internal components and the other end connection of the fitting to rotate together. This structure guarantees a stable and secure swivel or rotative function in the quick disconnect fitting or coupling 10 without the risk of torsion forces being imparted on the wave spring or other spring that may be used, and thus, damaging the function of the quick disconnect coupling 10.

In an example, the wave spring 80 can be made from flat wire that effectively reduces the height of the wave spring so that the same number of turns can reduce the work height without compromising the load or spring deflection. It is possible to increase the number of turns of the wave spring 80 configuration to decrease the deflection per turn when the wave spring is compressed. As a result, the spring rate is reduced proportionately to the number of turns and a flat linear characteristic can be generated.

In one example, the wave spring 80 has shim ends that form a flat end coil to permit a more consistent distribution of the spring forces, and therefore, an indentation of wave heights in the mounting parts is avoided. In the quick disconnect coupling device as a result, there is no variation in the wave height. The shim ends, such as a square-shim end in a crest-to-crest wave spring, provide a 360° contact surface, and thus, more evenly distributes the wave spring force.

The wave spring 80 can be formed from different materials. In one example, it may be formed from stainless steel type 17-7 pH that can withstand higher temperatures than other materials such as such SAE 1070-1090 carbon steel. It could also have a higher corrosion resistance. The wave spring material could be a single strand of pre-tempered flat wire that withstands about 650° F. (340° C.) and has a passivated finish and continuous coil with a uniform diameter and wave height. Other stainless steel can be used as well as beryllium copper, Inconel such as Inconel X-750, elgiloy, phosphor-bronze, and hastelloy C276. Each of these can have different purposes suited for specific applications, such as a stainless steel for high stress and fatigue applications, while the beryllium copper may be used for corrosion resistance in marine environments, and Inconel for high temperature and corrosion environments. The wave springs have a smooth, circular coiled sinusoidal wave form and allows more accurate and more predictable load and spring rates that are 50% tighter than other springs.

Figure 3:
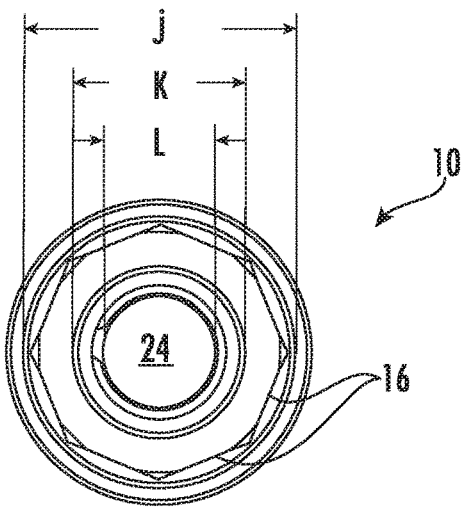
FIG. 3 is an end plan view looking in the direction of arrow 3 in FIG. 2A of the socket housing.

The component parts of the coupling 10 may have different dimensions. Non-limiting examples include: (a) as 55.49 mm; (b) as 27.88 mm; (c) as 12.70 mm; (d) as 18.54 mm; (e) as 33.22 mm; (f) as 35.50 mm; (g) as 19.00 mm; (h) as 24.08 mm; (i) as 17.50 mm diameter, and diameters (j), (k), and (l) in FIG. 3 as 29.72, 18.82, and 12.07 mm, respectively. These values can vary with tolerances known to those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A quick disconnect coupling, comprising:
a generally annular socket housing having a bore extending along a longitudinal axis therethrough and defining an axial fluid channel and a plug receiving end configured to receive therein a plug and a female connector at the opposing end, the socket housing further comprising an outer surface and shoulder stop formed thereon, and apertures adjacent the plug receiving end;
an annular lock sleeve carried by the socket housing and having an annular recess defining a spring passage with the outer surface of the socket housing, said lock sleeve being movable on the socket housing between a retracted position and an extended locking position toward the plug receiving end, and including an annular ball recess formed at the end of the lock sleeve adjacent the plug receiving end;
a spring contained in the spring passage and engaging the shoulder stop and biasing the lock sleeve into the extended locking position;
latch balls within said apertures and retained therein by said lock sleeve, wherein when the lock sleeve is in the extended locking position the latch balls are locked radially inward and engage an annular groove on a plug to lock the plug to the socket housing, and when the lock sleeve is retracted the latch balls are released to move radially outward while retained within said apertures by said ball recess during coupling and decoupling of a plug with the socket housing;
said bore including a first internal channel portion at the plug receiving end and a second internal channel portion adjacent and after the first internal channel portion and extending to the female connector;
a plunger received within the axial fluid channel of the socket housing and having a first end as a closed plunger face, an annular plunger shoulder adjacent the closed plunger face, and a sealing ring thereon adjacent the annular plunger shoulder, and a second end being substantially open and facing the plug receiving end, side orifices within said plunger allowing fluid flow therethrough, said plunger being longitudinally movable from a forward sealed position where the sealing ring is in sealed engagement with the second internal channel portion to prevent fluid flow, and a retracted, unsealed position engaging a connected plug allowing fluid flow into the tubular plunger via the side orifices into the second internal channel portion;
a wave spring having opposing first and second flat shim ends, wherein the first flat shim end is secured onto the annular plunger shoulder;
a first conical gasket formed of a polymeric material and having a shoulder, and secured at the shoulder to the second flat shim end of the wave spring;
a first retaining ring secured to the second internal channel portion adjacent the female connector;
a second conical gasket formed of a polymeric material and secured by the first retaining ring to the socket housing at the second internal channel portion adjacent the female connector; and
wherein first and second conical gaskets each include a flat surface angled at about 45° to the vertical plane and that interface each other in sliding engagement when the plug is fully received within the plug receiving end of the annular socket housing to allow rotative sliding movement relative to each other, wherein the first conical gasket, connected wave spring, connected plunger, and a plug received within the plug receiving end of the socket housing are free to rotate within the socket housing and minimize torsion forces and stress on the wave spring and within the socket housing.

2. The coupling according to claim 1, wherein said ball apertures are tapered inward and have a diameter to prevent a latch ball from passing into the axial fluid passageway.

3. The coupling according to claim 1, wherein said spring within said annular recess comprises a compression spring.

4. The coupling according to claim 1, further comprising a second retaining ring on said socket housing adjacent the plug receiving end and configured to engage the lock sleeve in its extended locking position and prevent further sliding movement.

5. The coupling according to claim 1, further comprising an O-ring in said first internal channel portion configured to engage a connected plug in sealed engagement to prevent fluid flow around the plug.

6. The coupling according to claim 1, wherein said plunger further comprises an annular groove at the first end and said sealing ring comprises an O-ring received within said annular groove.

7. The coupling according to claim 1, wherein said orifices comprise a plurality of orifices formed within the plunger at the open end and extend circumferentially around the plunger.

8. The coupling according to claim 1, wherein the first and second conical gaskets are formed from PTFE (Polytetrafluoroethylene).

9. A quick disconnect coupling, comprising:
a generally annular socket housing having a bore extending along a longitudinal axis therethrough and defining an axial fluid channel and a plug receiving end configured to receive therein a plug and a female connector at the opposing end, the socket housing further comprising an outer surface and shoulder stop formed thereon, and apertures adjacent the plug receiving end;
an annular lock sleeve carried by the socket housing and having an annular recess defining a spring passage with the outer surface of the socket housing, said lock sleeve being movable on the socket housing between a retracted position and an extended locking position toward the plug receiving end, and including an annular ball recess formed at the end of the lock sleeve adjacent the plug receiving end;
a spring in the spring passage and engaging the shoulder stop and biasing the lock sleeve into the extended locking position;
latch balls within said apertures and retained therein by said lock sleeve, wherein when the lock sleeve is in the extended locking position the latch balls are locked radially inward and engage an annular groove on a plug to lock the plug to the socket housing, and when the lock sleeve is retracted the latch balls are released and move radially outward while retained within said apertures by said ball recess during coupling and decoupling of a plug with the socket housing;
said bore including a first internal channel portion at the plug receiving end and a second internal channel portion adjacent and after the first internal channel portion and extending to the female connector, said second internal channel portion including an annular tapered shoulder intersecting the first internal channel portion;
a tubular configured plunger received within the axial fluid channel of the socket housing and having a first end as a closed plunger face, an annular plunger shoulder adjacent the closed plunger face, and a sealing ring thereon adjacent the annular plunger shoulder, and a second end being substantially open and facing the plug receiving end, a plurality of orifices extending circumferentially around the plunger to allow fluid flow therethrough, said plunger being longitudinally movable from a forward sealed position where the sealing ring is in sealed engagement with the tapered shoulder of the second internal channel portion to prevent fluid flow, and a retracted, unsealed position engaging a connected plug allowing fluid flow into the tubular configured plunger via the side orifices and into the second internal channel portion;
a wave spring having opposing first and second flat shim ends, wherein the first flat shim end is secured onto the annular plunger shoulder;
a first conical gasket formed of a polymeric material and having a shoulder, and secured at the shoulder to the second flat shim end of the wave spring;
a first retaining ring secured to the second internal channel portion adjacent the female connector;
a second conical gasket formed of a polymeric material and secured by the first retaining ring to the socket housing at the second internal channel portion adjacent the female connector; and
wherein first and second conical gaskets each include a flat surface angled at about 45° to the vertical plane and that interface each other in sliding engagement when the plug is fully received within the plug receiving end of the annular socket housing to allow rotative sliding movement relative to each other, wherein the first conical gasket, connected wave spring, connected plunger, and a plug received within the plug receiving end of the socket housing are free to rotate within the socket housing and minimize torsion forces and stress on the wave spring and within the socket housing.

10. The coupling according to claim 9, wherein said ball apertures are tapered inward and have a diameter to prevent a latch ball from passing into the axial fluid passageway.

11. The coupling according to claim 9, further comprising a second retaining ring on said socket housing adjacent the plug receiving end and configured to engage the lock sleeve in its extended lock position and prevent further sliding movement.

12. The coupling according to claim 9, wherein said spring within said annular recess comprises a compression spring.

13. The coupling according to claim 9, further comprising an O-ring in said first internal channel portion configured to engage a plug in sealed engagement to prevent fluid flow around the plug.

14. The coupling according to claim 9, wherein the first and second conical gaskets are formed from PTFE (Polytetrafluoroethylene).

* * * * *